United States Patent
Royer, Jr. et al.

(10) Patent No.: US 8,217,554 B2
(45) Date of Patent: Jul. 10, 2012

(54) ULTRASONIC VIBRATION SYSTEM AND METHOD FOR REMOVING/AVOIDING UNWANTED BUILD-UP ON STRUCTURES

(75) Inventors: Roger L. Royer, Jr., Williamsburg, PA (US); Joseph L. Rose, State College, PA (US); Edward C. Smith, Lemont, PA (US); Jose L. Palacios, State College, PA (US)

(73) Assignee: FBS, Inc., State College, PA (US)

( * ) Notice: Subject to any disclaimer, the term of this patent is extended or adjusted under 35 U.S.C. 154(b) by 503 days.

(21) Appl. No.: 12/473,923

(22) Filed: May 28, 2009

(65) Prior Publication Data

US 2010/0031972 A1 Feb. 11, 2010

Related U.S. Application Data

(60) Provisional application No. 61/056,681, filed on May 28, 2008.

(51) Int. Cl.
*H01L 41/09* (2006.01)
*B64D 15/00* (2006.01)
*B64D 15/20* (2006.01)

(52) U.S. Cl. ... 310/333; 310/311; 310/312; 310/323.01; 244/134 R; 244/134 A; 244/134 C; 244/134 D

(58) Field of Classification Search .................. 310/311, 310/312, 323.01, 323.02, 333, 336; 244/134 R, 244/134 A, 134 C, 134 D
See application file for complete search history.

(56) References Cited

U.S. PATENT DOCUMENTS

| | | | | |
|---|---|---|---|---|
| 2,385,662 | A * | 9/1945 | Vonnegut | 244/134 A |
| 4,545,553 | A * | 10/1985 | Finke et al. | 244/134 D |
| 4,570,881 | A * | 2/1986 | Lustenberger | 244/134 F |
| 4,732,351 | A * | 3/1988 | Bird | 244/134 D |
| 5,191,791 | A * | 3/1993 | Gerardi et al. | 73/178 R |
| 5,206,806 | A * | 4/1993 | Gerardi et al. | 340/582 |
| 2003/0116355 | A1* | 6/2003 | Bar-Cohen et al. | 175/56 |
| 2007/0184238 | A1* | 8/2007 | Hockaday et al. | 428/98 |
| 2008/0054762 | A1* | 3/2008 | Ludwiczak | 310/323.01 |
| 2009/0224104 | A1* | 9/2009 | Tenebre et al. | 244/134 R |

OTHER PUBLICATIONS

Palacios, J., L., Smith, E., C., "Dynamic Analysis and Experimental Testing of Thin-Walled Structures Driven by Shear Tube Actuators," 46th AIAA/ASME/ASCE/AHS/ASC Structures, Structural Dynamics & Materials, AIAA-2005-2112, Austin, Texas, Apr. 2005.

(Continued)

*Primary Examiner* — Thomas Dougherty
(74) *Attorney, Agent, or Firm* — Duane Morris LLP

(57) ABSTRACT

An ultrasonic method for removing and/or avoiding unwanted build-up on structures is provided, wherein the term build-up refers to, but is not limited to, ice, dirt, mud, or other wanted debris or contamination. Deicing or anti-icing structures of interest can include, but are not limited to, helicopter rotor blades, other helicopter blade components, fixed wing aircraft components, windshields in aircraft, automobiles, and other vehicles, ship hulls or other ship components, heat exchangers and other tubing where frost or ice could form, air-conditioning components, head lamp and other light coverings, bridge structures and components, and any structure where anti-icing or deicing would be beneficial. One or more ultrasonic actuators permanently embedded or coupled to the structure may be used accomplish the removal. The technique presented herein could also be utilized for non-destructive evaluation and structural health monitoring applications.

23 Claims, 11 Drawing Sheets

Stress distribution

OTHER PUBLICATIONS

Palacios, J., Smith., Zhu, Y., Rose., J., "Ultrasonic Shear and Lamb Wave Interface Stress for Helicopter Rotor De-Icing Purposes," 47th AIAA/ASME/ASCE/AHS/ASC Structures, Structural Dynamics & Materials, AIAA-2006-2282, Newport, Rhode Island, May 2006.

Palacios, J., Smith, E., Gao, H., Rose, J., "Ultrasonic Shear Wave Anti-Icing System for Helicopter Rotor Blade," 62nd Annual Forum Proceedings—American Helicopter Society, Phoenix, Arizona, May 2006.

Palacios, J., Smith, E., "Optimized Ultrasonic Shear Wave Anti-Icing Actuator for Helicopter Blades," 25th Army Science Conference, Orlando Florida, Nov. 2006.

Palacios, J., Smith, E., Zhu, Y., Rose, J., "Global Ultrasonic Shear Wave Anti-Icing Actuator for Helicopter Blades," 63rd Annual Forum—American Helicopter Society, Virginia Beach, VA May 2007.

Palacios, J.L., "Design, Fabrication, and Testing of an Ultrasonic De-Icing System for Rotor Blades", PhD Thesis, The Pennsylvania State University, Aerospace Engineering, to be published May 2008.

* cited by examiner

300 ↓

ULTRASONIC VIBRATION SYSTEM AND METHOD FOR REMOVING/AVOIDING UNWANTED BUILD-UP ON STRUCTURES

CROSS-REFERENCE TO RELATED APPLICATIONS

This application seeks priority under 35 U.S.C. §119(e) to U.S. Provisional Patent Application 61/056,681, filed May 28, 2008, the entirety of which is incorporated by reference.

FIELD OF THE INVENTION

Aspects of the invention relate to deicing, anti-icing, decontamination, or contamination prevention for structures where such capability would be beneficial. The technique invented here could also be utilized in non-destructive testing and structural health monitoring applications.

BACKGROUND INFORMATION

Ice formation on structures and components can cause decreases in component performance and, in some cases, component failure. Ice formation on helicopter rotor blades or on the wing leading edges of fixed-wing aircraft, for example, alter the aerodynamic characteristics of the aircraft and can result in reduced handling. Icing conditions, for the case of aircraft, often result in flight cancellations or delays. In the event that icing conditions are encountered during flight, ice build-up, which reduces aircraft handling and maneuverability, can cause the aircraft to crash.

Thermal deicing and pneumatic boot systems are used predominantly for structural deicing. These systems require significant power levels for operation. For the case of rotorcraft, the high power levels required by the thermal systems result in compromised rotorcraft functionality. Further, the thermal deicing systems often melt ice which then refreezes on other parts of the blade, wing, or component. Therefore, a need exists to replace thermal deicing systems with new technologies that require less power.

In addition to rotor blades and wing leading edges of fixed-wing aircraft, many other structures would benefit from a low-power deicing or anti-icing system, including, but not limited to, windshields in aircraft, automobiles, and other vehicles, ship hulls or other ship components, heat exchangers and other tubing where frost or ice could form, air-conditioning components, head lamp and other light coverings, and bridge structures and components.

The build up of dirt, mud, frozen soil, or other debris on structures can cause reduced functionality and increased weight. For example, excavation equipment can be difficult to start and operate if debris accumulates on the undercarriage of the equipment of vehicle. For excavation equipment, debris formation is sometimes mitigated by debris-phobic coatings which do not always work well and can wear overtime. Debris removal is often achieved using an object to strike the undercarriage to shake the debris loose. Using this time-consuming approach, project delays are often caused.

For excavation equipment, it would be beneficial to have debris prevention or removal technology that could be used during or after equipment use to prevent debris formation or quickly remove debris build-up.

Another example where debris build-up causes unwanted downtimes and increased cleaning costs is in the food industry where bacteria or other films can accrete to the inner diameter surface of tubing or pipes used to transport product. These tubes or pipes are routinely shut down and flushed with cleaning chemicals to remove unwanted build-up. There is a need to provide a technology to prevent build-up formation or assist the cleaning process in removing these films.

SUMMARY

It is an objective of an aspect of the invention to provide a method and arrangement for removing or preventing the formation of ice, mud, or other debris or contaminants, from structures where such capability would be beneficial.

It is also an objective of an aspect of the invention to reduce the amount of power required for ice, mud, debris or contamination removal or prevention via appropriate ultrasonic actuator design to excite specific ultrasonic modes in the structure.

It is a further objective of an aspect of the invention to improve the overall area of coverage for prevention of contamination and decontamination activities by using frequency tuning, over some frequency range and at some frequency increment, to change the structural areas where maximum ultrasonic stresses occur when considering the ultrasonic stresses produced in the structure from one or more actuators.

It is also an objective of an aspect of the invention to use frequency tuning to occasionally drive the actuator off-resonance to avoid over-heating or degradation of the actuator.

It is also an objective of an aspect of the invention to improve overall area of coverage by using multiple actuators combined with phased array focusing, using tone-burst pulse excitation, or time delay phasing, using continuous wave excitation, in the wave guide structure being considered to move the ultrasonic stress focal points around the structure.

It is also an objective of the present invention to use a tone burst or chirp input to the actuator, or actuators, to improve performance. The objectives are achieved as illustrated and described. In one embodiment, a method is provided including the steps of encompassing placing at least one ultrasonic actuator on the host structure and determining a special loading function to create a shear stress, normal stress, or other wave mechanics parameter in the host structure. The method further provides for activating the at least one ultrasonic actuator on the host structure to produce the shear stress via ultrasonic continuous wave activation, wherein at least one of ultrasonic initial transient wave propagation, reflection factor superposition, and time modal vibrations are used to at least one of delaminate and weaken an adhesion strength of the contamination to the host structure.

It is also an objective of the present invention to use a novel ultrasonic vibration technique for nondestructive testing or structural health monitoring purposes whereas a modal analysis approach is used for detection but transient wave analysis is used to select a particular guided wave mode, with a specific wave structure, to achieve improved detection sensitivity.

In another example embodiment, a method for at least one of removing and preventing ice from attaching to a host structure is provided. In this example embodiment, the method provides for the steps of one of permanently installing and periodically placing at least one ultrasonic actuator on the host structure, and activating the at least one ultrasonic actuator on the host structure to one of remove the ice from the host structure, decrease an adhesion strength of ice layers from the host structure and prevent ice from forming on the host structure In another example embodiment, a method for at least one of removing and preventing contaminants from attaching to a host structure is provided. In this example embodiment, a method step of one of permanently installing and periodically placing at least one ultrasonic actuator on the host structure is provided. Additionally, the method provides for activating the at least one ultrasonic actuator on the host structure to provide ultrasonic stresses in the host adhesion strength of the contaminants from the host structure and prevent contaminates from forming on the host structure are provided.

BRIEF DESCRIPTION OF THE DRAWINGS

FIGS. 10A, 10B and 10C illustrate the removal of ice layers from a steel plate using the ultrasonic frequency tuning approach.

DETAILED DESCRIPTION

Figure 1:
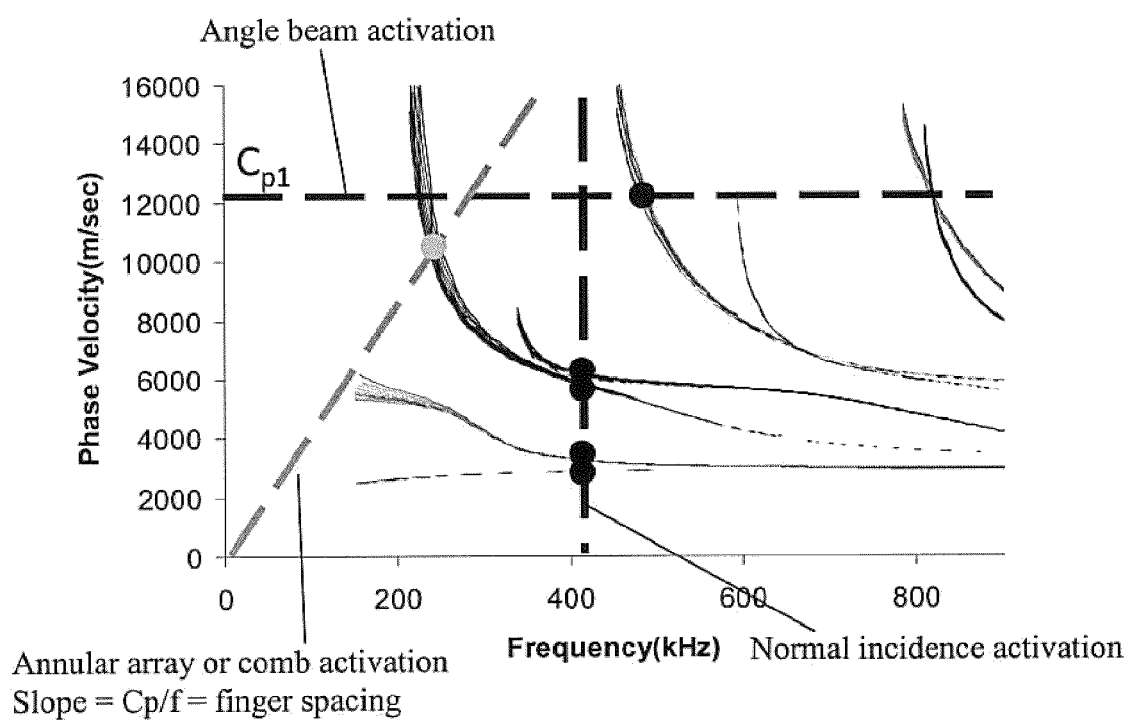
FIG. 1 illustrates a sample phase velocity dispersion curve showing activation lines for different loading scenarios.

In one non-limiting method of the invention, a phase velocity dispersion curve space is developed for a structure, in this example called a host structure. The host structure can be an airplane wing, a boat, a structural steel skeleton of a building, or other. The phase velocity dispersion curve space is then evaluated with respect to either a longitudinal wave ("Lamb type wave") or shear horizontal wave case for the structure such that activation produces a Lamb type wave or shear horizontal wave in the structure by using a specific actuator design. The appropriate point chosen on the velocity dispersion curve space is based on the wave structure across the thickness of the substrate/ice or substrate/contaminant structure. Maximum or reasonable shear stress or normal stress is generated at that point chosen on the velocity dispersion curve space in order to fracture, delaminate, or weaken the interface between ice or materials adhering to the host structure substrate. An angle beam, comb type, normal beam longitudinal, vertical shear, or horizontal shear actuator may be used to create the maximum or reasonable shear stress for the fracture or delamination. In one example embodiment, an ultrasonic vibration method may be used whereby continuous wave excitation is produced.

In the methods and apparatus provided, actuator positioning on the host structure is important as the transient wave generated by the transducers starts traveling through the host structure with a suitable wave structure. As the wave encounters boundaries, the wave is reflected at various angles. The initial wave patterns are complex but eventually, after many reflections and as the wave travels from one boundary to another, a modal pattern is established at a resonant frequency. There are many resonant frequencies fairly close together because of the ultrasonic excitation. Deicing or decontamination can often occur at a resonant or a non-resonant situation.

With appropriate test points from the dispersion curves for the structures, the wave structure is preserved, with respect to suitable stress at the ice/substrate or ice/contaminate interface, after the many reflections leading to the vibration state. The ice or contaminant is removed as a result of ultrasonic transient waves, reflection factors, and eventual vibrations that, via continuous interference of the wave pattern, produce sufficient shear stress at the ice/substrate or ice/contaminant interface to cause fracture and delamination. The vibration pattern depends on the initial specifically designed ultrasonic loading functions.

In one embodiment, the ultrasonic guided wave is launched using an ultrasonic actuator with minimal input energy to achieve deicing or decontamination of a surface. This method and configuration solves the long felt need of decontamination without need for large input energies into the host structure.

Deicing or decontamination is achieved by providing sufficient shear or normal stresses, or combination thereof, at the ice, mud, and/or debris—substrate interface at the ultrasonic guided wave launching point and possibly over the entire structure being considered.

One or more actuators with proper physical positioning may be considered in order to alter wave interference phenomenon to create a number of maximum constructive interference zones or focal points that could be moved around the structure as frequency and/or wave mode is changed, resulting in the creation of natural focal spots. These focal points may be moved, through user selection, allowing deicing/decontamination at specific points of the structure.

In an alternative configuration and method, phased array focusing, using tone-burst pulse excitation, or time delay phasing, using continuous wave excitation, in the wave guide structure being considered may be used to move the focal points around the structure, thus allowing a user to select where material removal occurs.

Ice, mud, and/or debris delamination from the structure and/or cracking occur as a result of sufficient shear stress, normal stress, or other wave mechanics parameter being provided to the ice, mud, and/or debris-substrate interface in combination with frequency tuning, tone burst excitation phased array focusing, continues wave excitation time phasing, wave reflection factor superposition with waves emitted from the actuator, and/or vibration modes generated as a result of numerous reflections from the boundaries of the structure.

Aspects of specific ultrasonic mode and frequency excitation over a finite frequency range from 1 Hz-500 MHz are provided wherein frequency tuning over a selected specific frequency range, phased array, time phasing, or natural focusing achieved via optimal sensor positioning, reflection factor point constructive interferences and special modal vibration combination releases, and possible use of ice or mud phobic coatings in combination with all of the above.

Either one or a combination of some or all of these concepts may be used for ice, mud, and/or debris prevention or removal, depending on the situation. For example, ice or debris type or thickness, structural geometry, environmental conditions, etc. will affect which concepts are applicable.

The apparatus and methods provided can be applied to isotropic media as well as anisotropic composite media. Further, various combinations of these concepts can be selected so as to not cause structural damage.

Figure 2:
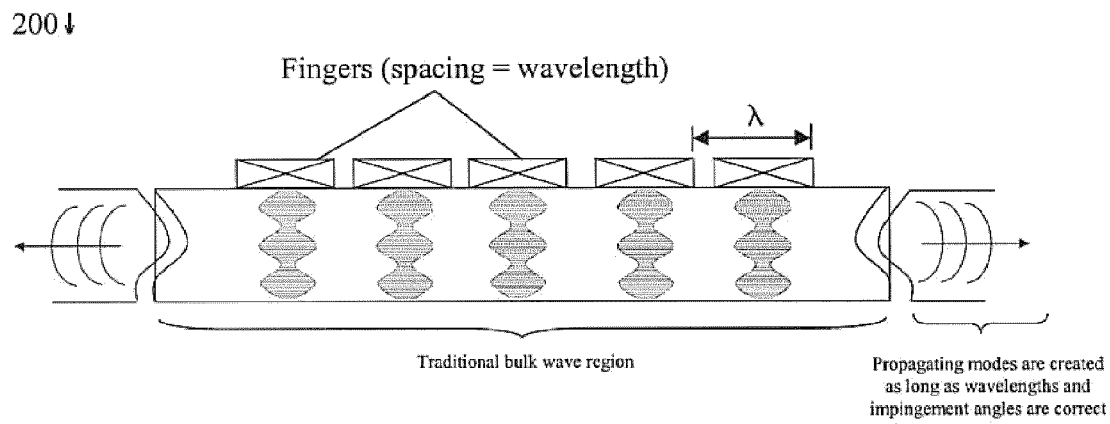
FIG. 2 illustrates a comb or annular array actuator arrangement, wherein the finger spacing dictates the mode that will be excited.
Figure 3:
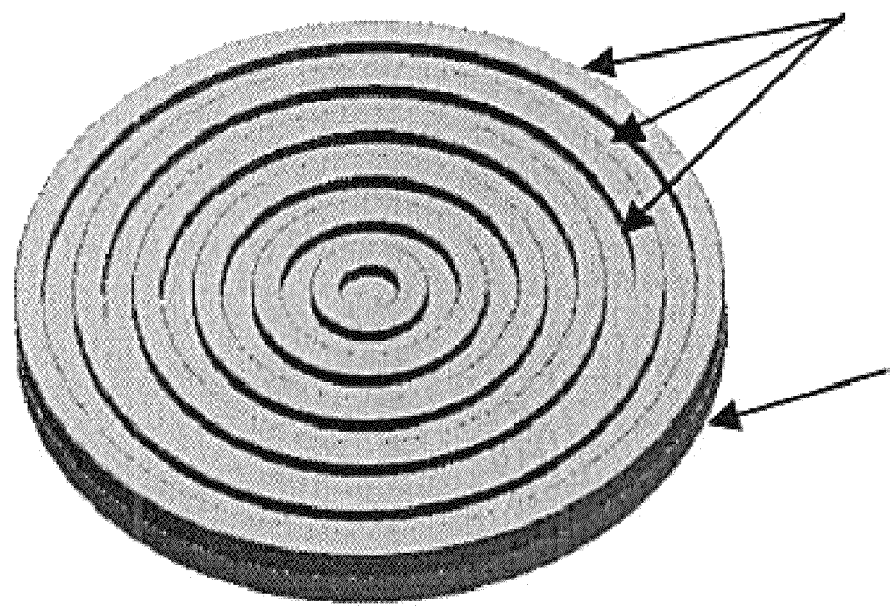
FIG. 3 is an annular array actuator design.
Figure 4:
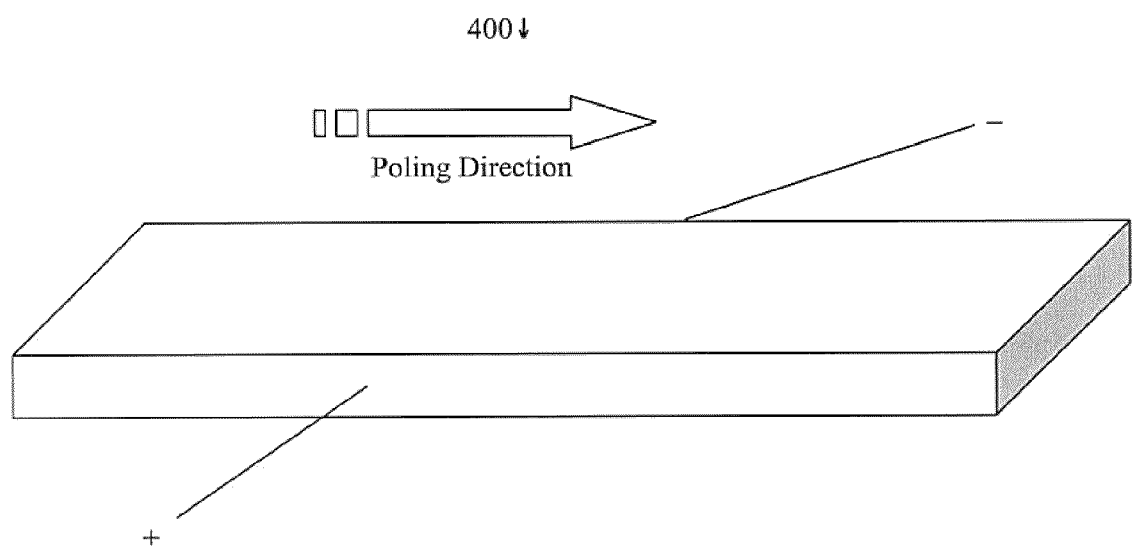
FIG. 4 is a shear polarized actuator, wherein the actuator is poled through the length and an electric field is applied across the width to operate in a $d_{15}$ configuration.

Optimal actuator design and actuator frequency for providing large shear stresses, normal stresses, or other wave mechanics parameter to the ice, mud, and/or debris interface can be achieved using analytical dispersion curve and wave structure analysis in combination with finite element method modeling. Actuator designs that can be considered non-limiting embodiments include, normal incidence loading using either shear polarized piezoelectric elements or conventional disks or bars poled through the thickness, angle beam loading to excite specific points on the guided wave phase velocity dispersion curve, or annular array or comb actuators, again, to provide specific mode control. For the case of normal loading, mode control is limited and the actuator will excite some component of all guided wave modes present at the actuator driving frequency. Angle beam loading can be used to excite specific guided wave modes according to Snell's Law. Annular array or comb actuators can also be used to excite specific points in the dispersion curve space by designing the finger spacing of the probe to be equal to the wavelength of the mode you wish to excite. As an example, FIG. 1 shows the activation lines on the phase velocity dispersion curve for each type of loading. FIG. 2 demonstrates the concept of a comb actuator and FIG. 3 shows an annular array actuator. FIG. 4 demonstrates the concept of a shear polarized actuator for operating in the $d_{15}$ configuration.

As an embodiment, basic curves associated with this phenomenon for ice layers of thicknesses 1 mm and 2 mm on an aluminum skin in FIG. 1 are provided.

Referring to FIG. 1, a sample phase velocity dispersion curve is shown with the activation lines for normal, angle beam, and comb loading. For a case of normal incidence, mode control is limited and the actuator will excite components of all modes present at the driving frequency. For a case of angle beam incidence, the angle of incidence can be determined using Snell's Law and the phase velocity of the desired wave mode. Once the incident angle is set, a horizontal activation line can be drawn on the dispersion curve and all modes intersecting the line can be excited by changing excitation frequency. For the case of comb activation, the activation line is drawn as shown with a slope equal to the wavelength or comb finger spacing. Again, all modes intersecting the activation line can be excited with the actuator by changing excitation frequency. The use of angle beam or comb activation is advantageous in that a single mode on the dispersion curve with a desired wave structure can be selected and the actuator can then be designed to excite the desired mode, and no other modes.

Referring to FIG. 2, a comb probe 200 is shown. The fingers in the probe 200 are designed to be one wavelength apart, depending on the mode and corresponding wavelength one chooses to excite.

FIG. 3 shows a drawing of an annular array actuator 300 in one non-limiting embodiment. The annular array 300 is equivalent to a comb actuator and finger spacing is chosen in the same manner. In this embodiment, an electrode pattern is placed on top of a piezoelectric disk to create the desired wave mode as selected by a user.

FIG. 4 shows a conceptual drawing of a shear polarized actuator 400. The actuator 400 is poled through the length and an electric field is applied across the width to operate in the $d_{15}$ configuration. Each of the shear polarized actuator 400, the annular array actuator 300 and the comb probe 200 may be attached in a permanent manner to a host structure or temporarily attached to a host structure for actuation of host structure. The actuation may be used, in example embodiments, to limit/remove contamination, such as ice, mud and materials from a surface that is desired to be clean.

Figure 5A:
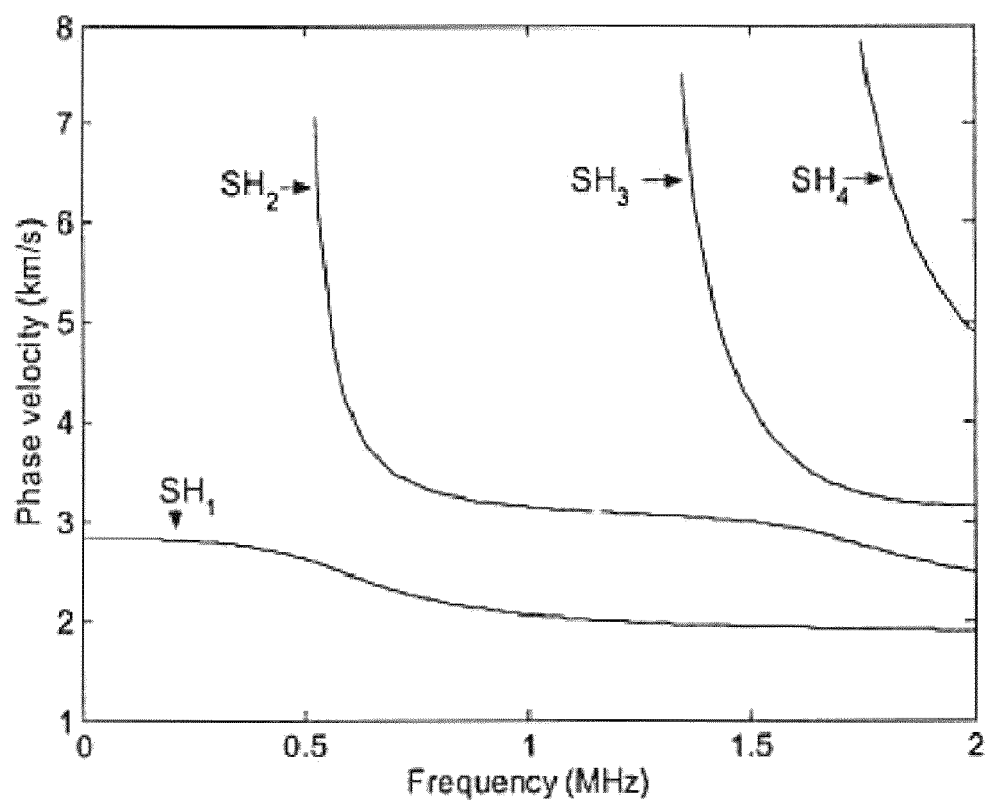
FIGS. 5A and 5B are examples of shear horizontal phase velocity dispersion curves for an aluminum skin with adhered ice layers.
Figure 5B:
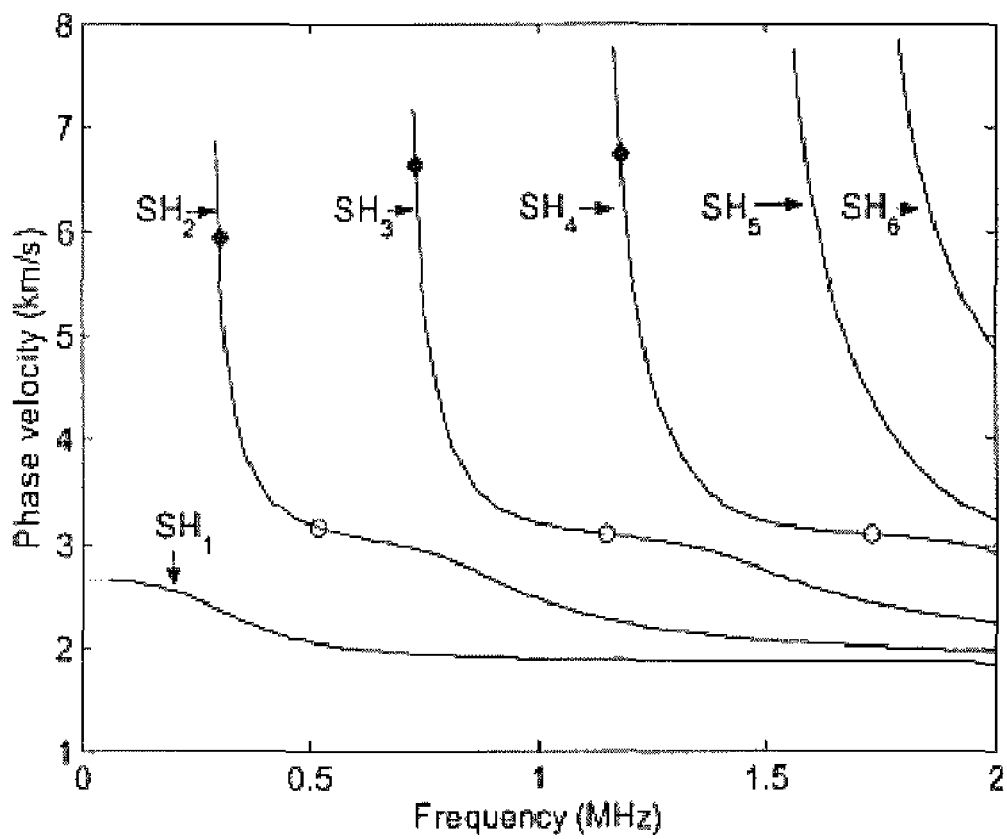

FIGS. 5A and 5B are examples of the ultrasonic guided wave phase velocity dispersion curves for an aluminum skin host structure with an ice layer frozen to the surface of the aluminum skin. Two ice layer thicknesses are represented in the curves. The curves have shifts as ice thickness varies. The dispersion curves represent possible transient wave guided wave modes that can be generated in this structure as a function of excitation frequency. Each point on the curve can be excited via special actuator design. Each point on the curve also has a different wave structure associated with it. Wave structure here refers to different displacement characteristics through the thickness of the part or aluminum skin. In addition to shear horizontal dispersion curves, Lamb wave dispersion curves can also be generated and analyzed similarly. Both types of dispersion curves can be generated for any substrate structure exposed to any ice layer or contaminant type or thickness.

Figure 6:
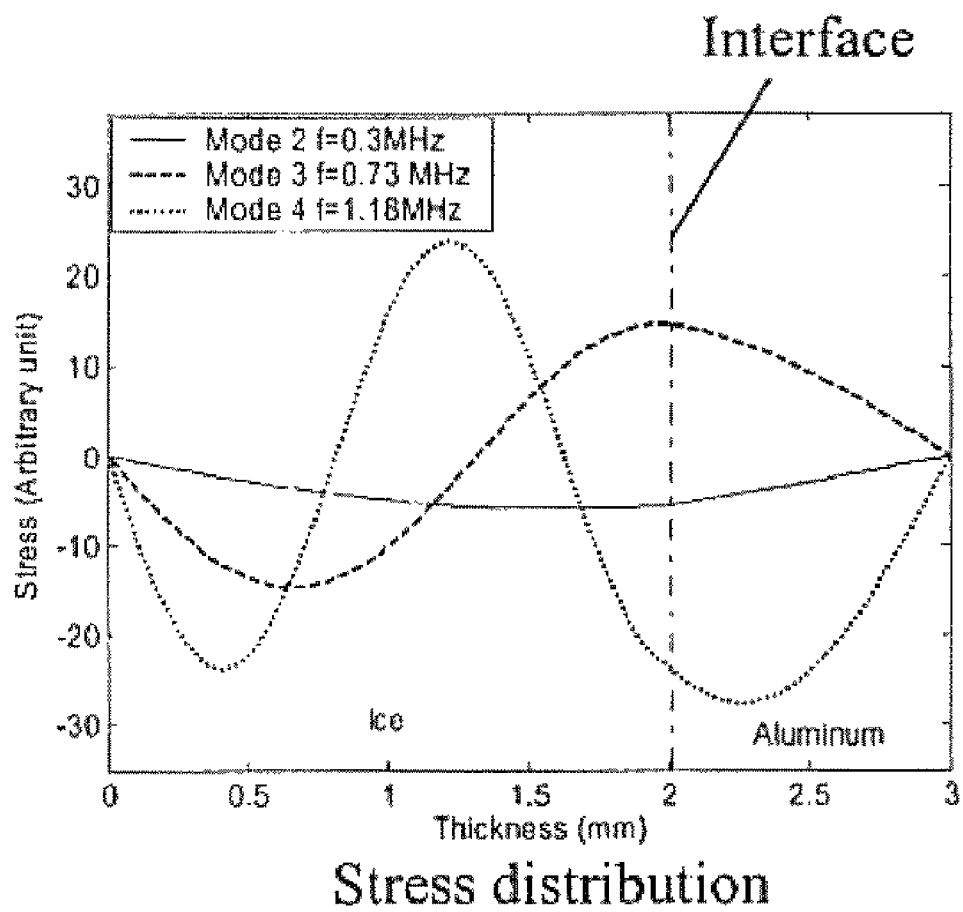
FIG. 6 illustrates a wave structure for a guided wave mode exhibiting large interface shear stresses.

FIG. 6 illustrates a shear stress distribution across the thickness of the aluminum skin host structure with ice layer for several selected points on the dispersion curve. In this example, mode 4 has a wave structure with relatively high shear stress at the aluminum plate/ice interface while mode 2 provides relatively low shear stress to the aluminum/ice interface.

Figure 7:
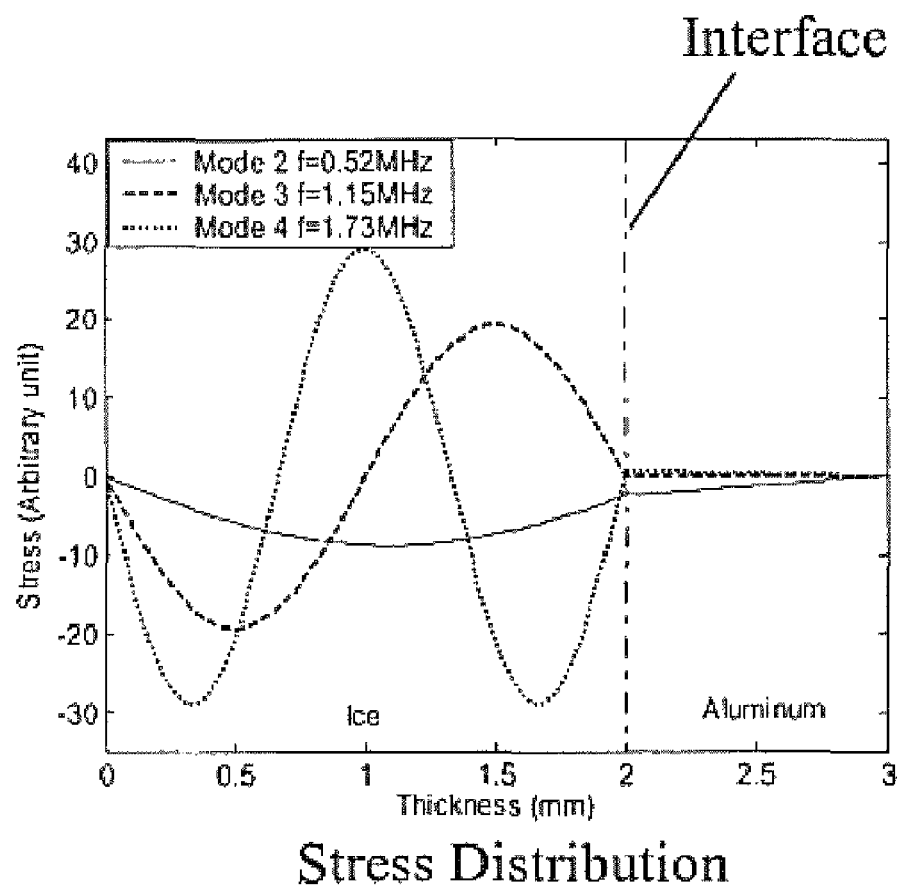
FIG. 7 illustrates a wave structure for a guided wave mode exhibiting small interface shear stresses.

FIG. 7 shows a shear stress distribution across the thickness of the aluminum skin with ice layer for several selected points on the dispersion curve. In this case, all of the modes provide low shear stress values to the interface.

Figure 8:
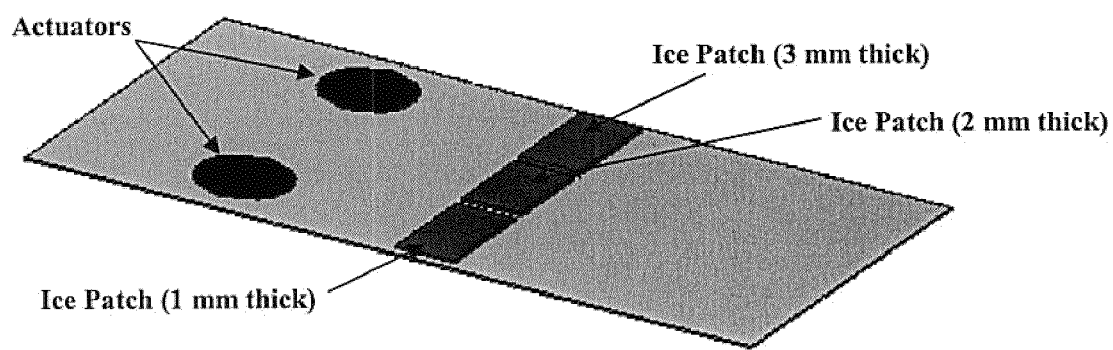
FIG. 8 shows an arrangement for a sample finite element method model used to predict the shear stresses produced at the interface of a steel plate with ice layers present.

FIG. 8 shows a finite element method (FEM) model arrangement to predict the stress produced in a steel plate with an ice patch as shown for a given actuator loading condition. There are two circular actuators embedded on the plate as shown. Three different ice thickness layers are provided in the model, wherein the actuators transfer ultrasonic energy into the different ice substrate.

Figure 9:
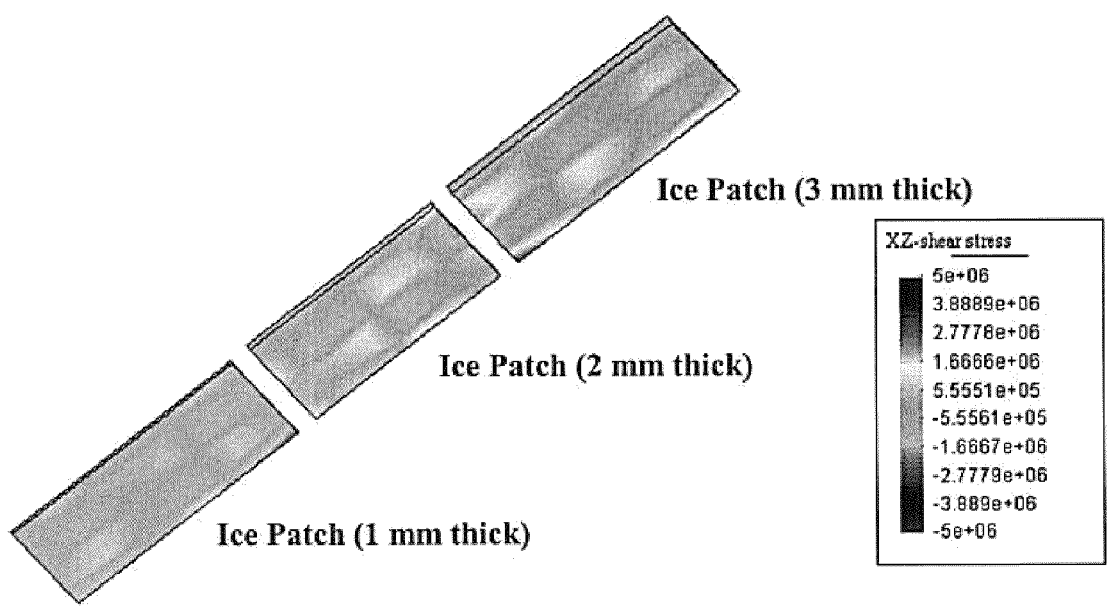
FIG. 9 illustrates a sample finite element method modeling result predicting the shear stresses produced at the plate/ice layer interface.

FIG. 9 shows the shear stresses occurring at the interface of the ice patches for the arrangement in FIG. 8. In this embodiment, the thicker ice patch has larger stresses at its interface than the two thinner patches.

Figures 10, 10C:

Referring to FIGS. 10A, 10B and 10C, the removal of ice layers from a steel plate using the ultrasonic frequency sweeping deicing approach is illustrated. In this example embodiment, two actuators were bonded to a 22 gauge steel plate with dimensions of 1 ft.×2 ft. Six ice patches were then frozen to various positions on the plate. Ice patch thickness varied between 0.5-3 mm. The actuators were turned on and automated frequency sweeping software was used to continuously move the focal spots throughout the entire plate. Experimentation and modeling were used to determine the frequency sweeping range, increment, and duty cycle. A combination of frequency change and distance to the ice patches determined when deicing would occur, which in this example takes 15 s for complete deicing. As demonstrated in FIGS. 10A, 10B and 10C, some of the ice patches were completely delaminated within 4 s of turning the actuators on. Complete de-icing of the plate occurred after 15 s of continuous mode-tuning. The plate was positioned at the bottom of the freezer for the entire experiment and the ice patches were formed over a period of 15 hours.

The ultrasonic vibration approach can also be used for nondestructive testing or structural health monitoring. The purpose here is to develop a new ultrasonic vibration technique to bridge the gap between ultrasonic wave propagation and lower frequency modal analysis vibration methods in nondestructive evaluation and structural health monitoring in order to find defects with intermediate size compared to the more standard ultrasonic non deconstructive testing and structural health monitoring testing techniques.

As an example, in ultrasonic practices it may be possible to detect a 0.010" long defect; in a vibration or modal vibration approach it might be possible to detects on the order of 5" in length. It is anticipated that with this new ultrasonic vibration technique that it will be possible to detect defects on the order or 0.5" long.

It is also proposed to inspect odd shaped parts with different attachment considerations or boundary conditions and even hidden, coated, or insulated parts as long as a small section is accessible.

The basic concept is as follows: the hypothesis is that the ultrasonic modal analysis result will depend on the initial ultrasonic loading function. The loading function would be associated with an ultrasonic sensor design based on dispersion curve analysis and corresponding wave structure to achieve special sensitivity to certain kinds of defects. In plane and out of plane displacements could be selected at any point across the structure to optimize defect detection sensitivity. The sensor could be a normal beam sensor of a certain diameter or it could be a comb type or annular array with specific segment spacing that would be able to get on to phase velocity dispersion curve at a specific point of interest. The idea behind this specific loading function is to be able to create a wave structure across the thickness of the test object that would achieve a certain stress distribution or other wave parameter distribution to be able to have high sensitivity for finding a certain kind of defect after hundreds of reflections from the edges of the structures in somewhat preserving the wave structure until the long time solution occurs in which a modal vibration pattern is reached, either on or off resonance. Multiple loading functions, in a series of tests, may also be used to find and describe different kinds of situations.

What is claimed is:

1. A method to at least one of remove and prevent ice, mud, debris, or other contamination from attaching to a single or multi-layer isotropic or anisotropic host structure, comprising:
    placing at least one ultrasonic actuator on the host structure;
    determining a loading function to create an appropriate shear stress, normal stress, other wave mechanics parameter, or combination thereof, at an interface of the host structure and a contaminant disposed on the host structure at the desired position and depth location; and
    activating the at least one ultrasonic actuator on the host structure to produce the shear stress via ultrasonic continuous guided wave activation, wherein at least one of ultrasonic initial transient wave propagation, reflection factor superposition, and time modal vibrations are used to at least one of delaminate and weaken the adhesion strength of the contamination to the host structure.

2. The method of claim 1, wherein one of a single ultrasonic receiver and multiple ultrasonic receivers are used to receive the ultrasonic stress waves produced by the at least ultrasonic actuator to perform one of nondestructive testing and structural health monitoring of the host structure.

3. A method of at least one of removing and preventing ice from attaching to a host structure, comprising:
    one of permanently installing and periodically placing at least one ultrasonic actuator on a surface of the host structure, the surface on which the at least one ultrasonic actuator is placed being spaced from each edge of the host structure; and
    activating the at least one ultrasonic actuator on the host structure to generate guided waves to provide ultrasonic stresses in the host structure to one of remove the ice from the host structure, decrease an adhesion strength of ice layers from the host structure and prevent ice from forming on the host structure.

4. A method of at least one of removing and preventing contaminants from attaching to a host structure, comprising:
    one of permanently installing and periodically placing at least one ultrasonic actuator on a surface of the host structure, the surface on which the at least one ultrasonic actuator is placed being spaced from each edge of the host structure; and
    activating the at least one ultrasonic actuator on the host structure to generate guided waves to provide ultrasonic stresses in the host structure to one of remove the contaminants from the host structure, decrease an adhesion strength of the contaminants from the host structure and prevent contaminates from forming on the host structure.

5. The method according to claim 1, wherein one of frequency tuning and sweeping of a given frequency range to naturally create and move ultrasonic stress focal points throughout the structure to provide full structural coverage to one of remove and weaken one of ice or contaminants from the host structure.

6. The method according to claim 1, wherein specific guided wave mode selection is used to minimize energy to one of remove and weaken contaminants from the host structure.

7. The method according to claim 1, wherein at least one of phased-array focusing tone-burst pulse excitation and time delay phasing using continuous wave excitation are used to drive multiple ultrasonic actuators to focus ultrasonic stresses at specific points on the host structure.

8. The method according to claim 1, wherein specific guided wave mode selection is used to excite a mode with a specific wave structure so that relatively high stresses occur mainly at the interface of the host structure and the ice or contamination layer to avoid detrimentally affecting the host structure.

9. The method according to claim 1, wherein at least one horizontal shear ultrasonic actuator, designed to utilize either a $d_{15}$ or $d_{33}$ mode of operation, is provided to create shear stress at a contamination/host structure interface to one of remove and weaken the adhesion strength of the contamination.

10. The method according to claim 9, wherein the $d_{15}$ or $d_{33}$ actuator is comprised of multiple $d_{15}$ or $d_{33}$ actuator elements in order to create a larger $d_{15}$ or $d_{33}$ actuator.

11. The method according to claim 10, wherein multiple actuators are used to form a larger actuator to avoid difficulties encountered with poling through a long actuator length.

12. The method according to claim 1, wherein at least one of a normal and an angle beam ultrasonic actuator are used to create a vertical shear stress at a contamination/host structure interface to remove the contamination.

13. The method according to claim 1, wherein the at least one ultrasonic actuator on the host structure is one of an annular array and a comb actuator.

14. The method according to claim 1, wherein high frequency ultrasonic vibration is used to generate shear stress at the contaminant/host structure interface.

15. The method according to claim 1, wherein at least one of a continuous wave, tone burst, and a chirp input signal is used to activate the at least one ultrasonic actuator on the host structure.

16. The method according to claim 1, wherein at least one of a coating, air pressure and heat are further used to one of minimize and remove the contamination.

17. The method according to claim 3, wherein at least one of tone-burst pulse excitation, phased array focusing and time delay phasing using continuous wave excitation are used to drive multiple ultrasonic actuators to focus ultrasonic stresses at specific points on the host structure.

18. The method according to claim 4, wherein at least one of tone-burst pulse excitation, phased array focusing and time delay phasing using continuous wave excitation are used to drive multiple ultrasonic actuators to focus ultrasonic stresses at specific points on the host structure.

19. The method according to claim 3, wherein at least one horizontal shear ultrasonic actuator is provided to create shear stress at a contamination/host structure interface to remove the contamination.

20. The method according to claim 4, wherein at least one horizontal shear ultrasonic actuator is provided to create shear stress at a contamination/host structure interface to remove the contamination.

21. The method according to claim 3, wherein the at least one ultrasonic actuator on the host structure is one of an annular array and a comb actuator.

22. The method according to claim 4, wherein the at least one ultrasonic actuator on the host structure is one of an annular array and a comb actuator.

23. The method according to claim 2, wherein the at least one ultrasonic receiver is used to receive the ultrasonic stress waves produced by the at least one ultrasonic actuator to perform at least one of nondestructive testing and structural health monitoring on any multi-layer structure via appropriate wave structure selection from the dispersion curves for the particular structure being examined to find defects at any depth location.

* * * * *